Feb. 19, 1946.   H. I. MORRIS   2,395,059
WELDING APPARATUS
Filed Aug. 29, 1941   9 Sheets-Sheet 1
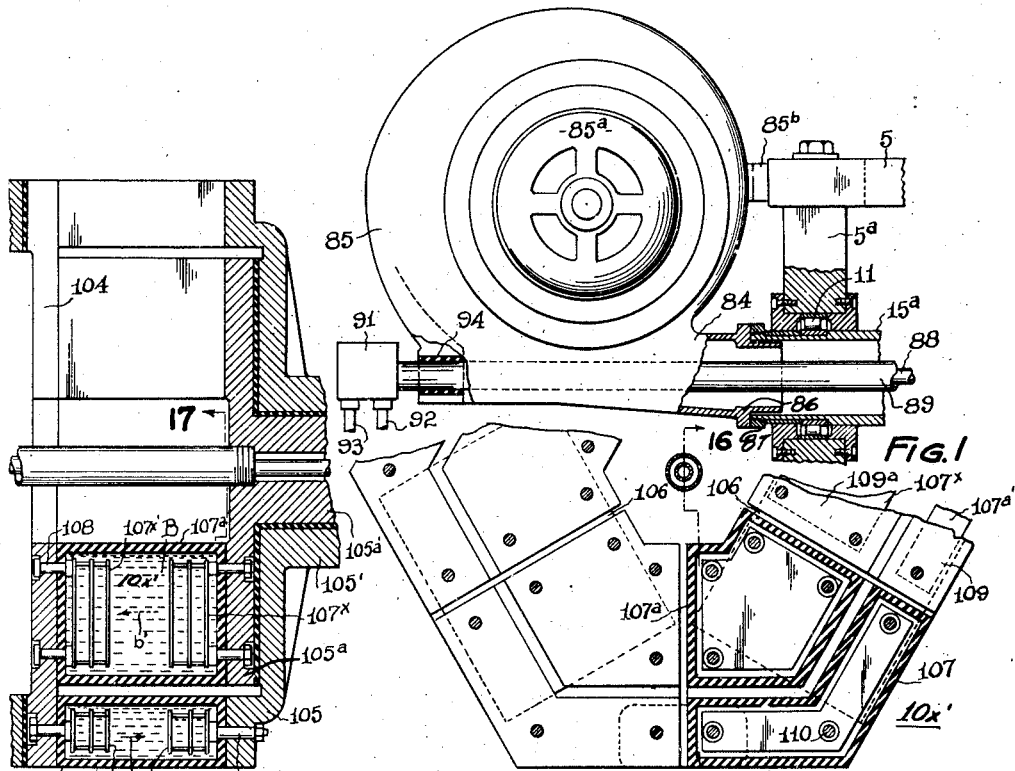
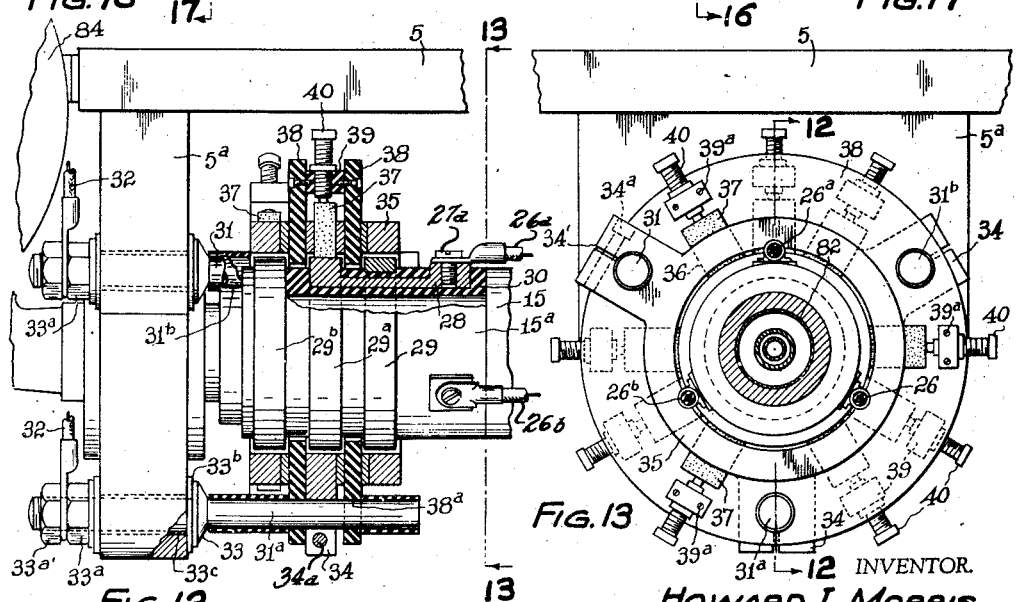
INVENTOR.
HOWARD I. MORRIS
BY
Geo. B. Pitts
ATTORNEY.

Feb. 19, 1946.　　　H. I. MORRIS　　　2,395,059
WELDING APPARATUS
Filed Aug. 29, 1941　　　9 Sheets-Sheet 3

INVENTOR
HOWARD I. MORRIS
BY Geo. B. Pitts
ATTORNEY

Feb. 19, 1946.  H. I. MORRIS  2,395,059
WELDING APPARATUS
Filed Aug. 29, 1941   9 Sheets-Sheet 4
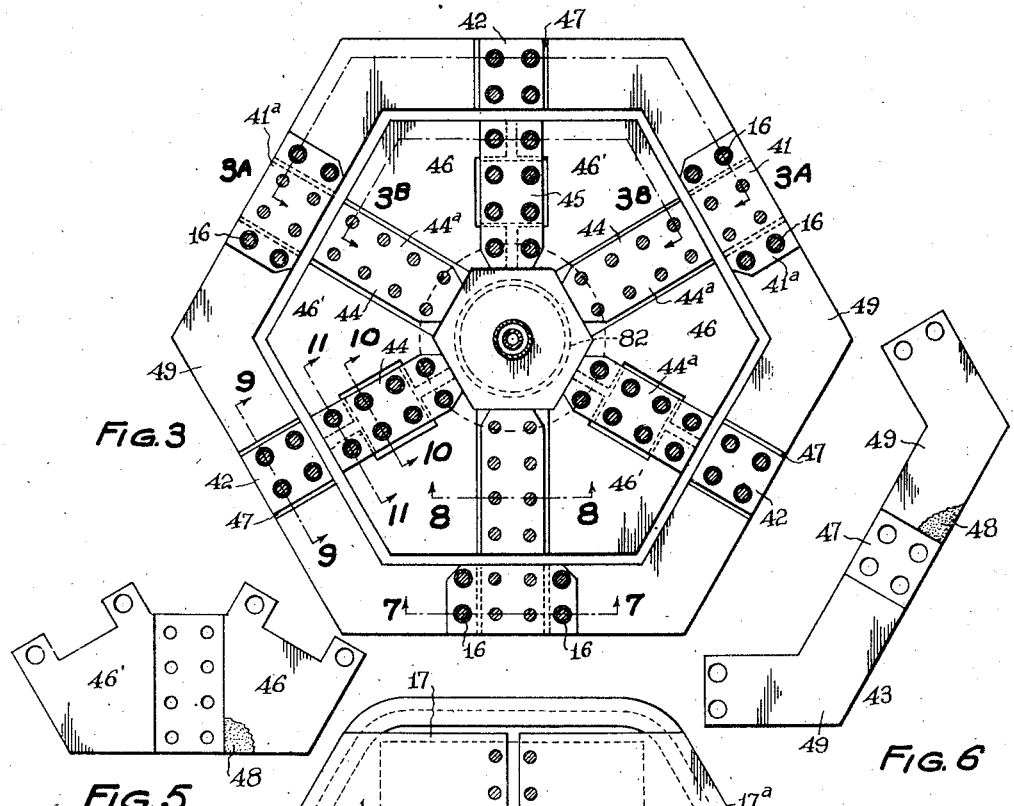
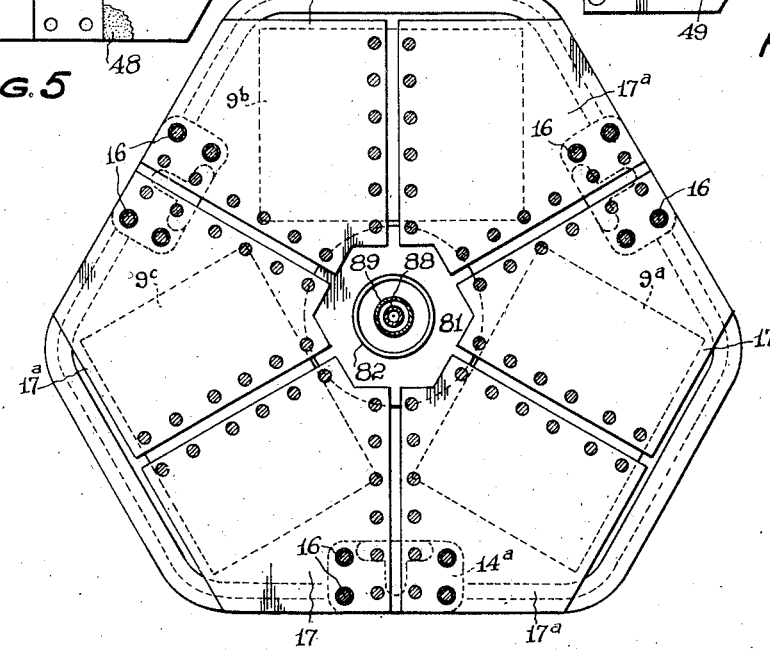
INVENTOR
HOWARD I. MORRIS
BY
ATTORNEY Feb. 19, 1946. H. I. MORRIS 2,395,059
WELDING APPARATUS
Filed Aug. 29, 1941 9 Sheets-Sheet 6

INVENTOR
HOWARD I. MORRIS
BY Geo. B. Pitts
ATTORNEY

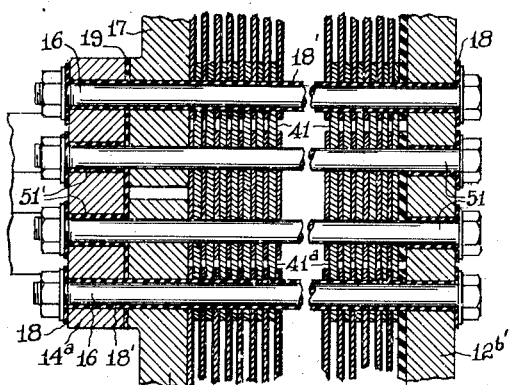
FIG. 7
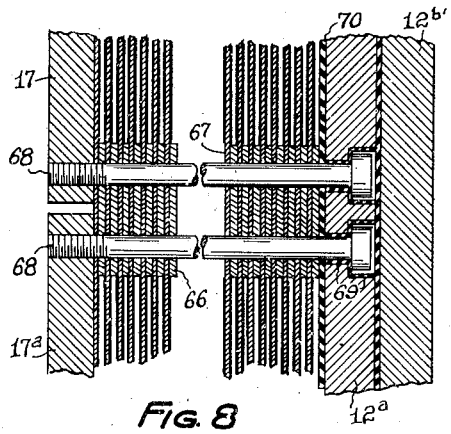
FIG. 8
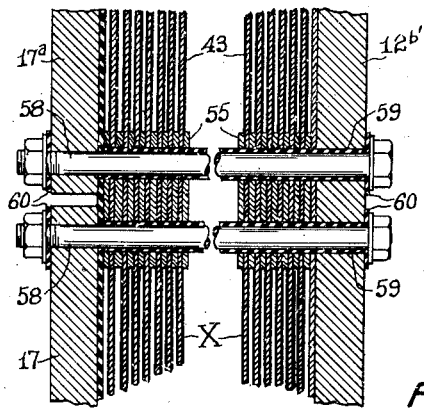
FIG. 9
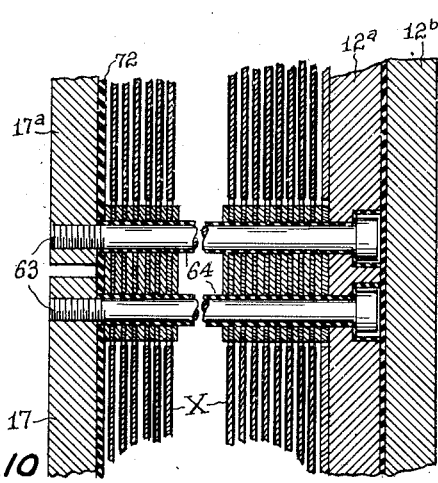
FIG. 10
FIG. 14
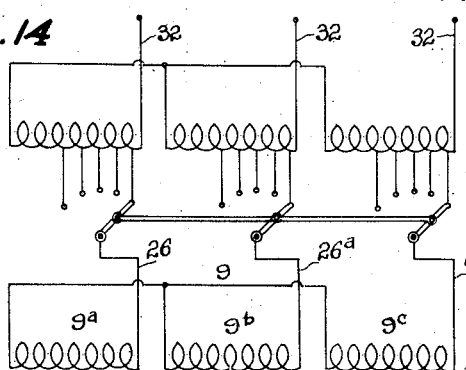
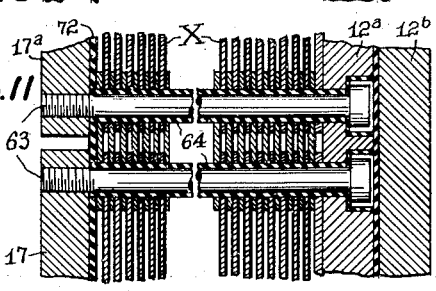
FIG. 11
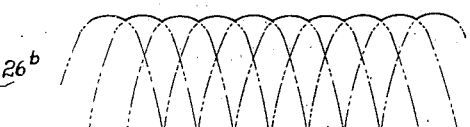
FIG. 15
INVENTOR.
HOWARD I. MORRIS
BY Geo. B. Pitts
ATTORNEY

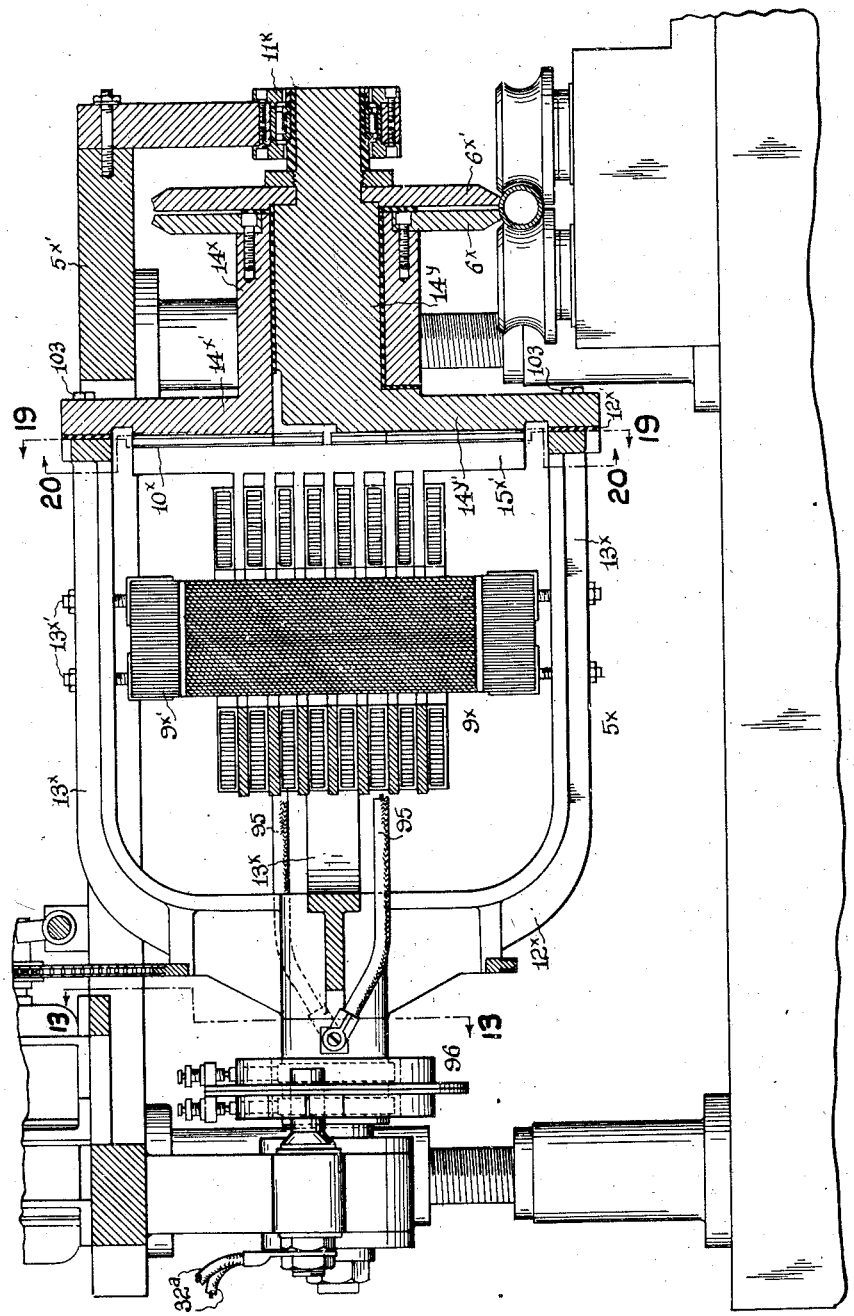

Feb. 19, 1946. H. I. MORRIS 2,395,059
WELDING APPARATUS
Filed Aug. 29, 1941 9 Sheets-Sheet 9

INVENTOR
HOWARD I. MORRIS
BY Geo. B. Pitts
ATTORNEY

Patented Feb. 19, 1946

2,395,059

UNITED STATES PATENT OFFICE 2,395,059

WELDING APPARATUS

Howard I. Morris, Lakewood, Ohio, assignor of one-third to Carl M. Yoder and one-third to Harvey O. Yoder, both of Lakewood, Ohio Application August 29, 1941, Serial No. 408,883

12 Claims. (Cl. 219—6)

This invention relates to electrical welding apparatus, more particularly to apparatus of the resistance type utilizing direct current for welding and employing rotatable electrodes. The apparatus may be used for welding various kinds of work, but for illustrative purposes it is shown as applied to the welding of the seams of pipes or tubular members.

One object of the invention is to provide a direct current welder wherein the direct current supply means rotates with the electrodes to thereby simplify the apparatus, increase the efficiency and reduce the cost of installation and operation.

Another object of the invention is to construct an improved direct current welder comprising a unitary, rotatable apparatus arranged to transform the supplied alternating current to the proper voltage for welding, rectify the current into direct current and supply the latter to the welding electrodes.

Another object of the invention is to provide an improved direct current welder wherein the supplied alternating current is transformed to the desired welding voltage and rectified into direct current and the direct current supplied to the welding electrodes through conductors to thereby eliminate brushes, sliding contacts and bus bars, whereby increased efficiency results.

Another object of the invention is to provide an improved direct current welder wherein a transformer, a rectifier and the welding electrodes are electrically connected to supply direct current to the welding electrodes and mounted to rotate as a unit, whereby direct current welding operations are effected by highly simplified apparatus and the expense of a separate apparatus for supplying direct current at low voltage is eliminated.

Another object of the invention is to provide an improved welding apparatus comprising a transformer for stepping down the A. C. current to a suitable welding voltage, a rectifier and the welding electrodes, mounted to rotate as a unit, with the electrodes in engagement with the work and wherein the rectifier is constructed to permit ready cooling thereof.

Other objects of the invention will be apparent to those skilled in the art to which my invention relates from the following description taken in connection with the accompanying drawings, wherein Figs. 1 and 1A together show a direct current welding apparatus embodying my invention and illustrated as employing a three phase transformer; parts in Fig. 1 being broken away and Fig. 1A being partly in section on the line 1A—1A of Fig. 2.

Figs. 2, 3 and 4 are sections on the lines 2—2, 3—3 and 4—4, respectively of Fig. 1A.

Figs. 5 and 6 are detail views.

Figs. 7, 8, 9, 10 and 11 are sections on the lines 7—7, 8—8, 9—9, 10—10 and 11, respectively of Fig. 3.

Fig. 12 is a fragmentary view of parts shown in Fig. 1, somewhat enlarged and partly in section on the line 12—12 of Fig. 13.

Figure 1A:
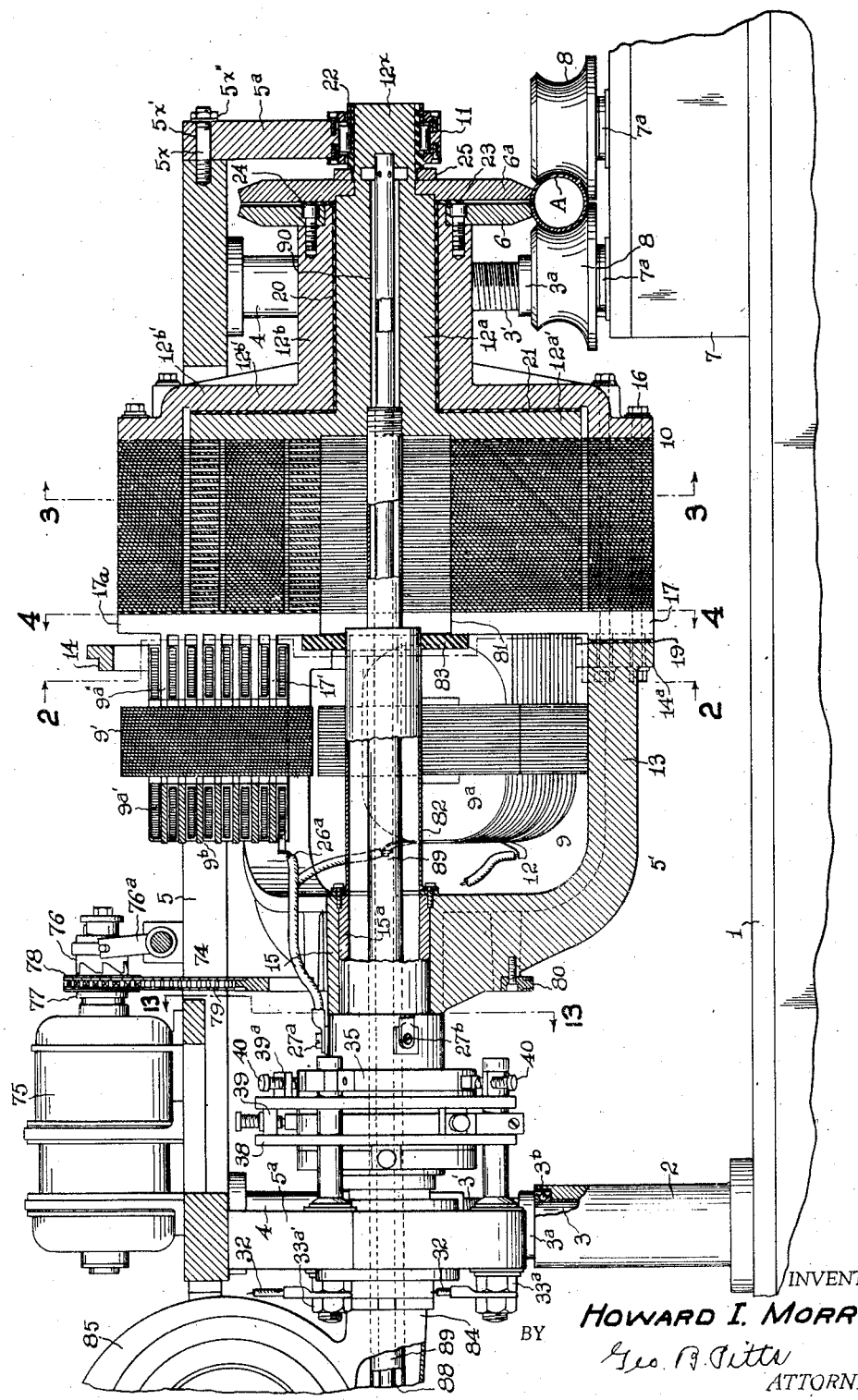

Fig. 13 is a section on the line 13—13 of Figs. 1A and 12.

Fig. 14 is a diagrammatic view of the circuits.

Fig. 15 is a diagram of the rectified current.

Fig. 16 is a fragmentary section on the line 16—16 of Fig. 17 showing a modified form of rectifier.

Fig. 17 is a fragmentary section on the line 17—17 of Fig. 16.

Fig. 18 is a view partly in section and partly in elevation of a modified form of direct current welding apparatus employing a single phase transformer.

Figure 19:
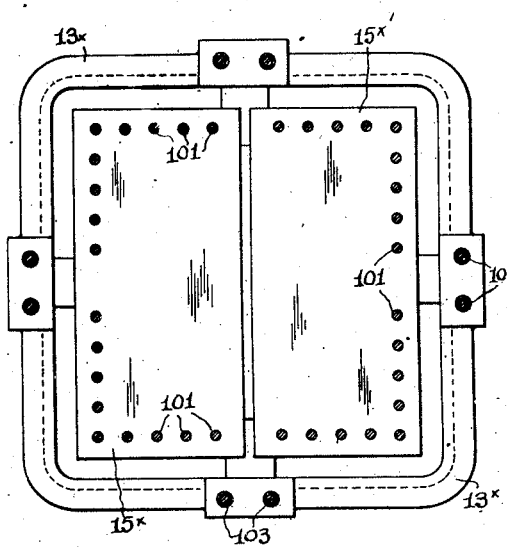
Figure 20:
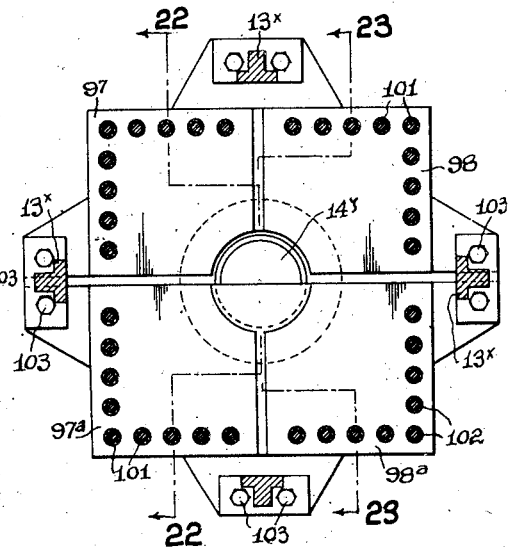
Figure 2:
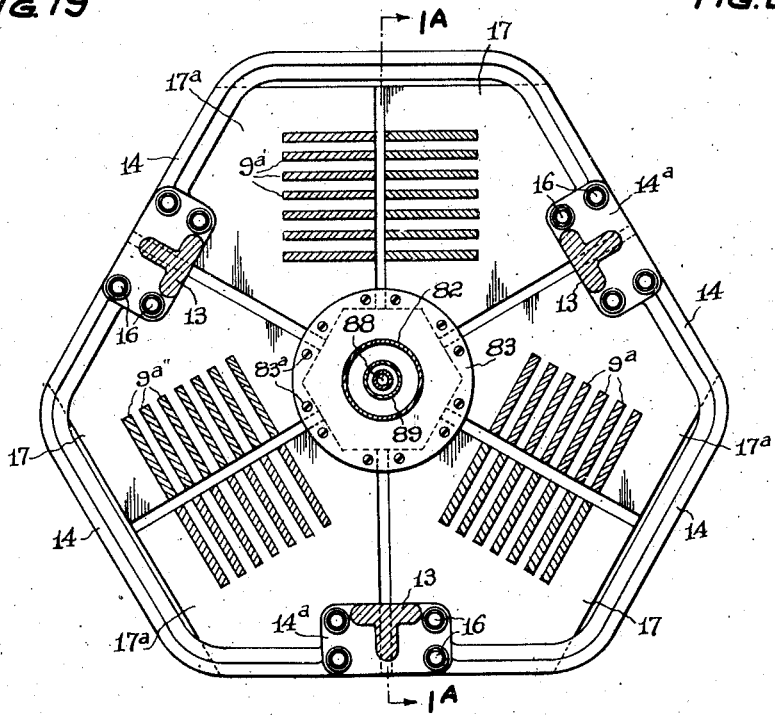

Figs. 19 and 20 are sections on the lines 19—19 and 20—20, respectively of Fig. 18.

Fig. 21 is a diagram showing the rectified current in the form of construction shown in Fig. 18.

Figure 22:
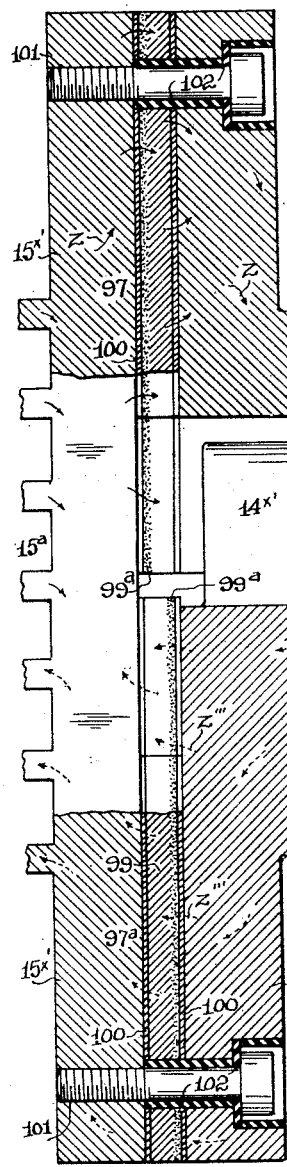
Figure 23:
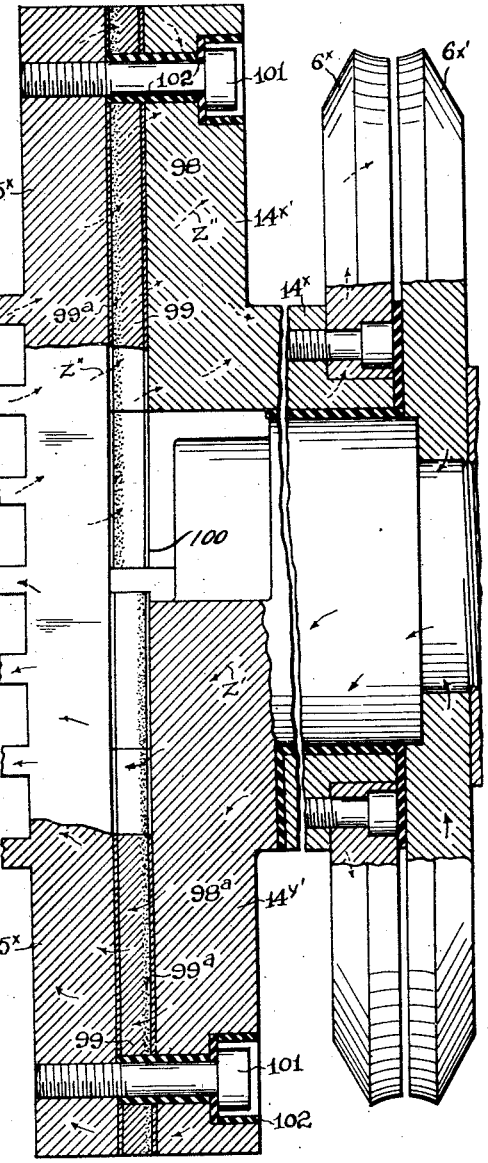

Figs. 22 and 23 are fragmentary views, partly in section on the lines 22—22 and 23—23, respectively, of Fig. 20.

In the drawings, 1 indicates as an entirety a base member supporting in spaced relation a plurality of hollow uprights 2 (preferably four in number but only one being shown) each forming a bearing for a spindle or shaft 3. Each spindle 3 is provided with a collar 3a which engages a suitable thrust bearing 3b mounted in the upper end of the adjacent upright 2. That portion of each spindle 3 above its collar 3a is provided with screw threads, as shown at 3', and fits into and engages the internally threaded walls of a tubular member 4 secured to and depending from a frame 5, to which reference will later be made. As will be understood, there is one tubular member 4 for each spindle 3. The spindles 3 may be simultaneously operated in any desired manner, preferably by a power driven mechanism, such as disclosed in my co-pending application Serial No. 366,521, filed November 22, 1940, (now Letters Patent No. 2,283,942, dated May 26, 1942), to which reference may be made. The operation of the spindles 3 serves to raise or lower the frame 5, the effect of which is to (a) insure effective frictional engagement between the electrodes 6, 6a, and the pipe A, whereby the movement of the pipe A rotates the electrodes and parts connected thereto, or (b) raise the electrodes clear of the pipe A, as when it is desired to re-finish the peripheries of the electrodes.

The base member 1 supports a gear box 7, in which are mounted spaced shafts 7a, the latter extending upwardly and provided on their upper ends above the box 7 with pressure rolls 8 which engage the sides of the pipe A. The shafts 7a may be driven in opposite directions by the gearing within the box 7; suitable rolls (not shown) serve to feed the pipe A endwise. The rolls 8 are removably mounted on the shafts 7a, so that rolls having varying curvilinear shapes in cross section may be mounted on the shafts. The pipe A may be supplied in lengths or sections or supplied continuously from a suitable forming or shaping mechanism (not shown).

The frame 5 forms a support for a rotatable mounting 5' on which is supported the welding mechanism consisting (a) of three single phase transformers (each connected on a different phase interconnected to constitute a three phase transformer, indicated as an entirety at 9, (b) the electrodes 6, 6a, and (c) a rectifier, indicated as an entirety at 10, the input side of which is electrically connected to the ends of the secondary winding of each of the transformer units 9a, 9b, 9c, as later set forth, and the out-put side of which is electrically connected to the electrodes 6, 6a (as later set forth). Each transformer unit 9a, 9b, 9c, consists of a suitable laminated core 9'; a primary winding 9a' and a secondary winding 9a" having terminals 17, 17a (see Figs. 1, 3A, 3B and 4). The transformer units are wound to reduce the voltage supplied by the mains (later referred) to a suitable welding voltage, which may vary from approximately three to six volts.

5a, 5a, indicate suitable hangers depending from the opposite ends of the frame 5 and each provided at its lower end with suitable anti-friction bearings 11 (see Figs. 1 and 1A), which support one end portion of the mounting 5'. The hanger 5a adjacent to the electrodes 6, 6a, is removably secured to the frame 5 in any desired manner. In the arrangement shown, the frame 5 is provided with a pair of outwardly extending pins 5x (only one being shown) having threaded outer end portions and the hanger 5a is formed with through openings 5x' to receive the pins 5x, and nuts 5x" tightened on the pins 5x against the hanger 5a serve to removably secure the latter in position.

The mounting 5' comprises three sections 12, 12a, 12b, the transformer units 9a, 9b, 9c, being positioned within and in fixed relation to the section 12 and the sections 12a, 12b, being formed of suitable conducting material, such as copper, and serving as conductor devices from the out-put terminals of the rectifier 10 to the electrodes 6, 6a, respectively, the rectifier 10 being interposed between the inner ends of the conductor devices 12a, 12b, and the terminals 17, 17a, of the secondary windings 9a" of the transformer units 9a, 9b, 9c. The section 12 preferably consists of a cage-like device having a plurality of arms 13 (preferably three arms) integrally connected together at their ends adjacent the electrodes 6, 6a, by bars 14 and integrally connected at their opposite ends to a hub 15. The hub 15 is rigidly connected to the inner end of a tubular shaft 15a, the axis of which is in line with an imaginary center about which the arms 13 are positioned. The shaft 15a is mounted in the adjacent bearing 11 as shown in Fig. 1. The sections 12a, 12b, consist of inner and outer concentrically related devices electrically and rigidly connected at their outer ends to the electrodes 6, 6a, respectively (the inner device 12a having an extension 12x which is mounted in the adjacent bearing 11—see Fig. 1A) and provided at their inner ends with annular members 12a', 12b', respectively, electrically connected to the out-put side of the rectifier 10, as later set forth.

Figure 3A:
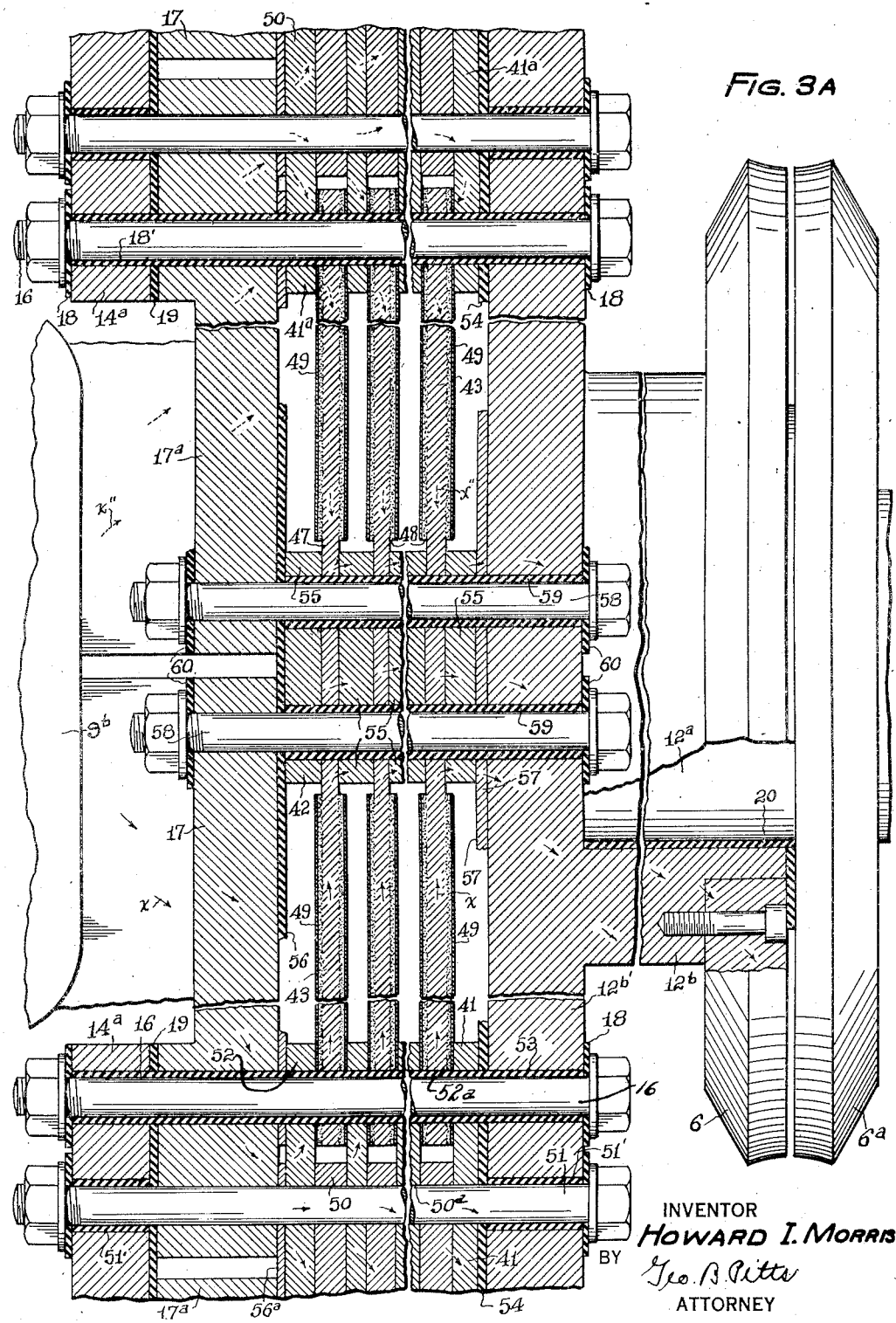
Figs. 3A and 3B are fragmentary views, partly in section on the lines 3A—3A and 3B—3B, respectively, of Fig. 3, enlarged.

The parts of the mounting 5' and the rectifier 10 are rigidly secured together by bolts 16 engaging pads 14a, integrally connected to the arms 13 and bars 14, and the marginal portion of the annular member 12b', the bolts 16 extending through certain parts of the rectifier 10 as later set forth. As shown in Figs. 7 and 3A, the bolts 16 are suitably insulated from the pads 14a, the adjoining terminals 17, 17a, of the secondary windings 9a" of the transformer units, the annular member 12b' and other parts later referred to by the insulation material 18 and a sleeve 18' formed of insulation material.

The terminals 17, 17a, of each of the secondary windings 9a" are insulated from the mounting section 12 by suitable insulation material 19 (see Figs. 1A, 7 and 3A); also, the mounting sections 12a, 12b, are insulated from each other by suitable insulation material 20, 21; also, the extension 12x is insulated from the adjacent hanger 5a by insulation material 22 and the electrodes 6, 6a, are insulated from each other by suitable insulation 23.

The conductor device 12b is reduced at its outer end to form a seat for the electrode 6, which is secured to the conductor device by countersunk screws 24; also, the conductor device 12a is reduced at a point beyond the conductor 12b to form the extension 12x, the resulting shoulder forming a seat for electrode 6a and the opening in the latter being rabbeted to fit over said shoulder. The electrode 6a is held in position in its seat by a ring nut 25 threaded on the extension 12x.

The electrical connections to the primary windings 9a' comprise the following: 26, 26a, 26b, indicate leads leading from the terminals 27, 27a, 27b, respectively, to the primary windings, the terminals being integrally connected to conductors 28 (only one being shown—see Fig. 12) and the latter in turn being connected at their outer ends to current collecting rings 29, 29a, 29b, respectively. Each terminal 27, 27a, 27b, the conductor 28 and ring connected thereto are insulated from the remaining corresponding parts and shaft 15a by suitable insulation material 30 (see Fig. 12). 31, 31a, 31b, indicate rods formed of conducting material, one for each supply main 32 (only two supply mains being shown in Fig. 12), mounted in and extending through the adjacent hanger 5a, each rod having a collar 33 engaging the inner face of the hanger 5a to which it is clamped by a nut 33a on the outer end of the rod engaging the outer face of the hanger, a separate nut 33a' serving to secure the adjacent main 32 to the nut 33a. The collar 33 and nut 33a on each rod 31, 31a, 31b, are insulated from the hanger 5a by washers 33b formed of suitable insulation material and each rod is insulated from the hanger by a sleeve 33c formed of suitable insulation material. The inner end of each rod 31, 31a, 31b, extends through an opening formed in an arm 34 integrally connected to and extending radially of an annulus 35 which is formed of conducting material and surrounds one of the collecting rings 29, 29a, 29b. Each arm 34 is split, as shown at 34', so that by means of a screw 34a the split portions may be drawn toward each other to rigidly secure the arm to the adjacent rod and hold the adjacent annulus 35 in position. Each annulus 35 is formed with a radial slot 36—preferably three slots, in which a suitable brush 37 is slidably mounted to engage the adjacent collecting ring 29, 29a or 29b. 38 indicates a pair of annular disks formed of insulation material surrounding the shaft 15a, one being disposed between the collecting rings 29, 29a, and the other being disposed between the collecting rings 29a, 29b. The disks 38 are formed with sets of alined openings 38a, one set for each rod 31, 31a, 31b, through which the rods extend to support the disks in position. The disks 38 support between them blocks 39, each related to one of the adjacent brushes 37 and formed with a threaded opening for an adjusting screw 40 which engages the adjacent brush to hold it in engagement with the adjacent collecting ring 29a. The adjusting screws 40 for holding the brushes 37 in engagement with the rings 29 and 29b are mounted in blocks 39a which are secured to the opposite outer faces of the disks 38.

The rectifier consists of a form of construction wherein the alternate flow of current in one direction from the terminals of the secondary winding of the single phase transformer (see Figs. 18, 19, and 20) or each unit of a three-phase transformer (see Figs. 1A to 11) always flows to one electrode 6 or 6a and the flow of current in the opposite direction always flows from the other electrode to said terminals alternately; accordingly the alternating current is rectified into direct or uni-directional current, as shown in Figs. 14, 15 and 21.

Figure 3B:
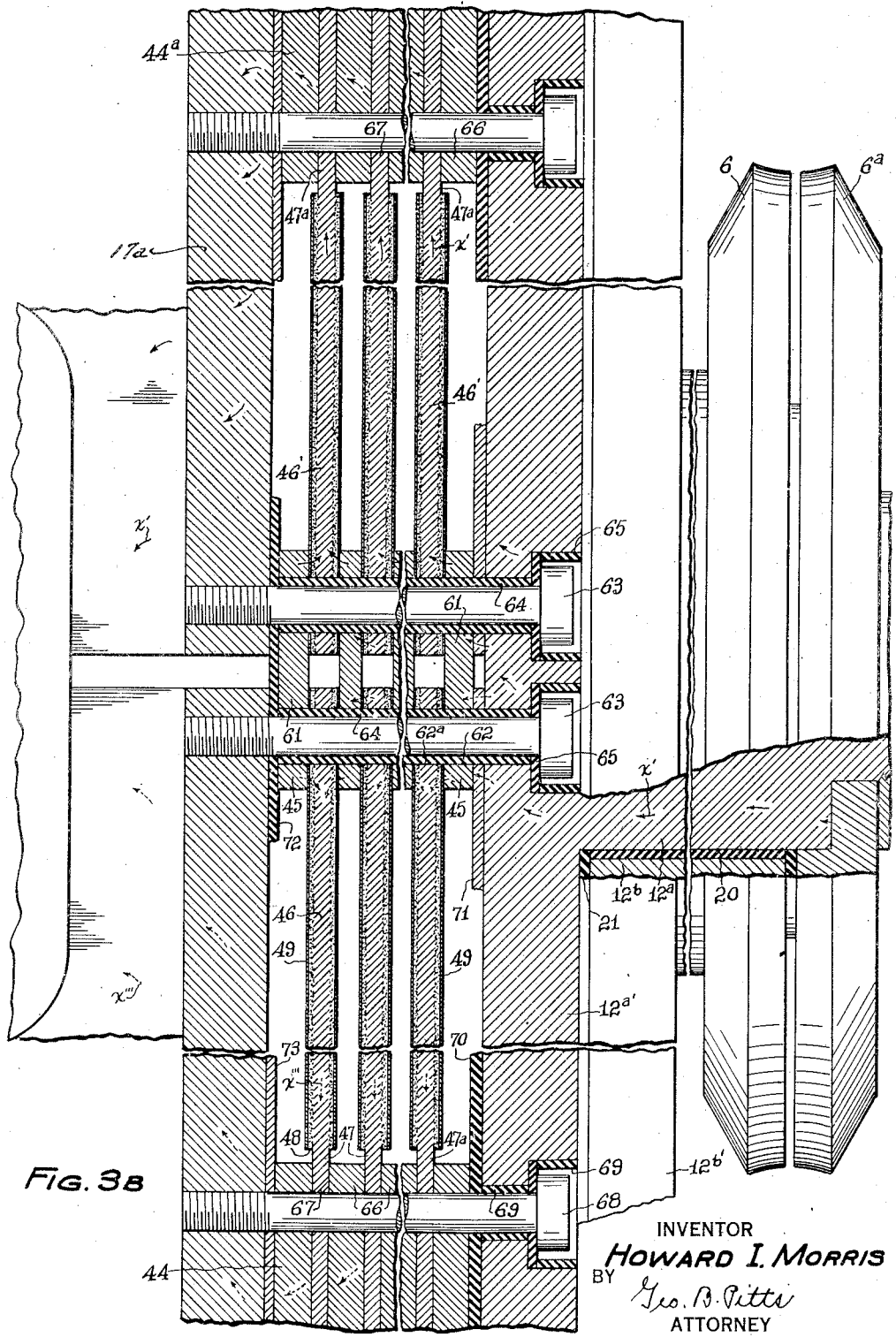

In the form of construction shown in Figs. 1A to 11, inclusive, and Figs. 3A and 3B, employing a three-phase transformer, the rectifier 10 is electrically connected to the terminals of the secondary winding of each transformer unit and the conductor devices 12a—12a' and 12b—12b' in the same manner so that reference to these connections (for example for the unit 9b) will suffice for the remaining units, similar parts in the connections for the remaining units being identified by the same reference characters. In this arrangement I provide for each transformer unit (a) a pair of conductors electrically connected with the terminals of the secondary winding of the transformer unit and a conductor intermediate thereto electrically connected with one of said conductor devices 12a, 12b, and rectifying elements between each said conductor, which is connected to the said terminals, and the adjacent intermediate conductor which is connected to one of the conductor devices 12a, 12b, each element carrying a rectifying medium (indicated by the heavy line X in Figs. 7 to 11, inclusive), which permits flow of the current into or through the element in one direction only; (b) a pair of conductors, electrically connected to the secondary winding terminals of the transformer unit, a conductor intermediate said pair of conductors, electrically connected to the other conductor device and separate rectifying elements between said intermediate conductor and said pair of conductors. Accordingly, the alternate flow of current in one direction from the secondary winding terminals flows to one conductor device 12a or 12b and the electrode connected thereto and the current in the opposite direction from the other electrode and the conductor device connected thereto flows through the other intermediate conductor to the adjacent pair of conductors alternately and from the latter to the terminals of the secondary winding of transformer unit.

It will thus be understood that when current flow is from the terminal 17 (arrows $x$) through the conductor 41, the current flow in the opposite direction is through conductor 45, rectifying elements 46' (arrows $x'$) and conductor 44a to terminal 17a; upon reversal of the current, current flow is from the terminal 17a, through conductor 41a (arrows $x''$) and the current flow in the opposite direction is through conductor 45, rectifying elements 46 (arrows $x'''$) and conductor 44 to the terminal 17.

Referring to Figs. 3A and 3B, which are enlarged views on the lines 3A—3A and 3B—3B, respectively, of Fig. 3, 41, 41a (Fig 3A), indicate a pair of conductors in electrical connection with the secondary winding terminals 17, 17a, and 42 indicates a conductor intermediate the conductors 41, 41a, in electrical connection with the conductor device 12b'. 43 indicates the rectifying elements between the conductors 41, 41a, and the conductor 42. 44, 44a (Fig. 3B), indicate a pair of conductors in electrical connection with the secondary winding terminals 17, 17a, and 45 indicates a conductor intermediate the conductors 44, 44a, in electrical connection with the conductor device 12a'. 46 indicates the rectifying elements between the intermediate conductor 45 and the conductor 44, and 46' indicates the rectifying elements between the intermediate conductor 45 and the conductor 44a.

In the arrangement above set forth, when the current is flowing from one terminal (for example, terminal 17 of the secondary winding 9a''), it flows through the conductor 41 (see arrows $x$—Fig. 3A), the rectifying elements 43 and the intermediate conductor 42 to the conductor device 12b'—12b, which is connected to the electrode 6 and through the work to the electrode 6a; and simultaneously the current from the electrode 6a is flowing through the conductor device 12a—12a' to the intermediate conductor 45 (see arrows $x'$—Fig. 3B), the rectifying elements 46' between it and the conductor 44a to the latter conductor, and to the other secondary winding terminal 17a. Upon the reversal of current in the secondary winding 9a'' of the unit 9b, the current flows from the terminal 17a through conductor 41a (see dotted arrows $x''$—Fig. 3A), rectifying elements 43, intermediate conductor 42 and conductor device 12b'—12b to the electrode 6 and through the work to the electrode 6a; and simultaneously the current from the electrode 6a is flowing through the conductor device 12a—12a' to the intermediate conductor 45 (see dotted arrows $x'''$—Fig. 3B), rectifying elements 46 and conductor 44 to the terminal 17.

The current flow as above described is effected by providing between each intermediate conductor (42 and 45) and the conductors related thereto (which are electrically connected to the terminals 17, 17a, respectively), rectifying elements each constructed to rectify the alternating current, so that such current always flows therethrough in one direction. To secure this result, each of the rectifying elements consists of a plate 47 formed of copper, having on corresponding portions of its opposite surfaces layers of copper oxide 48 and on each surface of the copper oxide 48, and co-extensive therewith, a layer of copper 49; thereby exposing or leaving a portion of each plate 47, as shown at 47a devoid of the copper oxide 48 and copper layers 49, for electrical contact or connection with the adjacent conductor.

In this form of construction the conductors 41, 41a, electrically contact the copper layers 49 and the adjacent intermediate conductor 42 electrically contact the portions 47a of the copper plate 47 (see Fig. 3A) so that one polarity of the current alternately flows from the terminates 17, 17a to the conductor 42; whereas the intermediate conductor 45 electrically contacts the copper layers 49 and the adjacent conductors 44, 44a electrically contact the portions 47a of the copper plates 47, so that the opposite polarity of the current flows from the conductor 45 to the rectifying elements 46, 46', alternately.

It will thus be seen that the rectifying elements are provided with a current rectifying medium, which is interposed in the path of current flow between the secondary winding terminals 17, 17a, and the electrodes 6, 6a, and by providing a rectifying element between each secondary winding terminal and one of the electrodes and a rectifying element between the other electrode and each secondary winding terminal, the supplied A. C. is rectified to supply direct current flow in one direction to one electrode and through the work to the other electrode and direct current flow in the opposite direction from the latter electrode.

As shown, (a) I provide a plurality of rectifying elements 43 between each intermediate conductor 42 and the adjacent conductors 41, 41a, respectively, one of these elements being shown in Fig. 6, is being noted that each set of rectifying elements 43 is common to the adjacent conductors 41, 41a; and (b) I provide a set of rectifying elements between each intermediate conductor 45 and each of the adjacent conductors 44, 44a. While these sets of rectifying elements are connected to the terminals 17, 17a, of the adjacent transformer unit (for example unit 9b), each set is electrically connected to one set of rectifying elements of the units 9a, 9c, that is, each element of each set is electrically connected with one element or one set of elements for one of the other units, as will be understood from Figs. 3, 3B and 5.

Each of the conductors 41, 41a, consists of a plurality of blocks 50, each formed of copper, spaced to receive between them the adjacent end portions of the rectifying elements 43, so that portions of the blocks 50 overlap and electrically contact with the copper layers 49 thereon. As shown in Figs. 3, 3A and 7, the blocks 50 are formed with (a) alined openings 50a to receive a bolt 51, which is insulated from the adjacent pad 14a and conductor device 12b'—12b by sleeves 51' formed of insulation material, and (b) alined openings 52 in alinement with alined openings 52a formed in the adjacent rectifying elements 43 to receive the bolts 16, the bolts 16 and 51 serving to clamp the blocks 50 and rectifying elements 43 together and to the adjacent secondary winding terminal (17 or 17a) and conductor device 12b'—12b. As shown, the bolts 16 are insulated from the adjacent pad 14a, terminal, blocks 50, rectifying elements 43 and conductor device 12b'—12b, as already set forth; also, the block 50 adjacent to the conductor device 12b'—12b is insulated from the latter by a sheet of insulation material 54. As shown in Fig. 3A, the free ends of the rectifying elements 43 are spaced from those blocks 50 which are in opposed relation to such ends to prevent contact of said blocks with the copper plates 47.

As will be understood from Figs. 3 and 7, the blocks 50 forming each conductor 41, 41a, are common to one secondary winding terminal of one transformer unit and the opposite terminal of the secondary winding of the adjacent transformer unit.

The intermediate conductor 42 consists of a plurality of blocks 55 spaced to receive between them the rectifying elements 43, but as the layers of copper oxide 48 and copper layers 49 terminate at points remote from the opposite sides of the blocks 55, the latter electrically contact the copper plates 47; accordingly, the current from either terminal 17 or 17a, flows through the adjacent conductor 41 or 41a, copper layers 49 and layers of copper oxide 48 to the copper plate 47 and to the blocks 55, which are in electrical contact with the conductor device 12b'—12b. The block 55 adjacent to the terminals 17, 17a, is insulated therefrom by a sheet of insulation material 56. To compensate for the thickness of the sheet 56, a sheet of copper 56a is interposed between each block 50 adjacent to one of the terminals 17, 17a, and the latter. Likewise, to compensate for the thickness of the insulation sheet 54, a sheet of copper 57 is interposed between the block 55 adjacent to the conductor device 12b'—12 and the latter. The blocks 55 and copper plates 47 are formed with sets of alined openings, to receive bolts 58 which rigidly clamp the blocks 55 and plates 47 together and to the terminals 17, 17a, and conductor device 12b'—12b, the bolts being insulated from these parts by sleeves 59 and washers 60, each formed of suitable insulation material.

The intermediate conductor 45 consists of a plurality of blocks 61 formed of copper and spaced to receive between them the adjacent ends of the rectifying elements 46, 46'. The blocks 61 are formed with sets of alined openings 62 alined with openings 62a formed in the rectifying elements 46, 46', to receive screws 63 to clamp these parts together and to the conductor device 12a'—12a and terminals 17, 17a, the heads of the bolts being countersunk in the conductor device 12a' and their opposite ends being threaded into the terminals 17, 17a, respectively (see Fig. 3B). The bolts 63 are insulated from the blocks 61 and elements 46, 46', by sleeves 64 formed of insulation material and insulation 65. Each of the conductors 44, 44a, consists of a plurality of blocks 66 formed of copper and spaced to receive between them the plates 47 forming parts of the adjacent rectifying elements. The blocks 66 and plates 47 are formed with alined openings 67 to receive a screw 68 which clamps these parts together and to the conductor device 12a'—12a and adjacent secondary winding terminal, the head of the screw being countersunk in the conductor device 12a' and its opposite end being threaded into the adjacent terminal. The screw 68 is insulated from the conductor device 12a' by sections of insulation material 69. The block 66 adjacent to the conductor device 12a' is insulated therefrom by a sheet of insulation material 70 and the thickness of the sheet 70 is compensated for by spaced sheets of copper 71 between the block 61 adjacent to the conductor device 12a' and the latter. The block 61 adjacent to the terminals 17, 17a, is insulated therefrom by a sheet of suitable insulation material 72 and the thickness thereof is compensated for between each block 66 adjacent to the adjacent terminal by a sheet of copper 73.

The copper plates 56a serve to connect adjacent terminals 17 and 17a of adjacent transformer secondary windings, as shown in Fig. 3A, and thus connect the secondary windings in a delta connection as shown in Figure 14. It is also clear that conductor devices 12a and 12b leading to the welding electrodes are bridged by a plurality of rectifying paths, each consisting of two rectifier units connected in series (such as units 43 and 46), and each point of the delta connection is connected to the midpoint of one of the rectifying paths. While six rectifying paths are shown in Fig. 14, it is obvious that only three paths are essential for full wave rectification from the delta connection of the secondary winding.

74 indicates as an entirety means for positively rotating the mounting 5′, such operation permitting the application of a suitable tool to the peripheries of the electrodes 6, 6a, to refinish them. The rotating means 74 comprise a motor 75 supported on the frame 5 and a power transmitting mechanism between the motor shaft and mounting 5′. The power transmitting mechanism consists of the following: 76 indicates a movable clutch element splined on the extended end of the motor shaft and operated by a yoke 76a into and out of engagement with a clutch element 77 loose on the motor shaft, a sprocket 78 fixed to the clutch element 77 and an endless chain 79 engaging the sprocket 78 and a sprocket 80 fixed to the hub 15.

Provision is made for cooling the electrodes 6, 6a, by water or other liquid and cooling the rectifier 10 by air, the construction of the latter, as already set forth, permitting the circulation of air into and through all parts thereof and the escape of the air from the rectifier. As shown in Figs. 1A, 3 and 4, the terminals 17, 17a, of the transformer units 9a, 9b, 9c, and sets of rectifying elements 46, 46′, are cut away or shaped at their inner ends to form an enlarged opening or area 81 between the transformer units and the annular member 12a′ of the conductor device 12a, the annular member 12a′ serving to close the outer end of this opening and thus force all of the air supplied into the inner end thereof into and through the parts constituting the rectifier 10. The air is supplied to the opening 81 by a pipe 82, the inner end of which terminates at the inner end of the opening 81 (preferably within the inner ends of the terminals 17, 17a—see Fig. 1A), said inner end of the pipe 82 being supported in an opening formed in a bar 83 of insulation material secured to the terminals 17, 17a, by screws 83a (see Fig. 2). The outer end of the pipe 82 is connected to the inner end of the hollow shaft 15a, the outer end of which is connected to the discharge nozzle or outlet 84 of a suitable blower 85, the rotor of which is driven by a motor 85a (see Fig. 1). The discharge nozzle 84 of the blower 85 extends into and loosely fits the hollow shaft 15a. The blower 85 is rigidly connected to the frame 5 by suitable brackets (only one thereof being shown at 85b) which maintain a collar 86 adjacent the end of the discharge nozzle 84 against an annular wall 87, preferably consisting of a ring nut threaded on the adjacent end of the shaft 15a. The blower 85 supplies air under pressure through the shaft 15a and pipe 82 into the opening 81 (the shaft and pipe serving as a conduit between the blower and opening) for flow or circulation of air between and through the spaced parts constituting the rectifier 10.

As shown in Fig. 1A, the shaft 15a and pipe 82 are large enough to provide for the flow of air therethrough and accommodate inner and outer water circulating pipes 88, 89. The inner end of the pipe 89 is threaded into the outer end of an opening 90 formed in the conductor device 12a. The pipe 89 extends from the device 12a outwardly through the discharge nozzle or outlet 84 of the blower 85 and the remote end wall of the outlet, its outer end being rotatably mounted in a fitting 91 and connected through the latter to a discharge pipe 92 leading to a sump or sewer (not shown). The pipe 88 is rotatably mounted at its outer end in the fitting 91 and connected therethrough with a water supply pipe 93 leading from a source of supply under suitable pressure. The pipe 88 extends through the pipe 89 and opening 90, its inner end fitting into and supported by the closed inner end walls of the opening 90, the inner end of the latter being preferably reduced to form a seat for the pipe. Inwardly of the seat for the pipe 88, the opening is enlarged and the side walls of the pipe opposite said enlargement are formed with ports through which the water supplied into and through the pipe 88 is discharged for return flow through the opening 90, pipe 89, fitting 91 and discharge pipe 92.

As shown in Fig. 1, the outer end of the pipe 89 extends through and rotates in a bushing 94, formed of suitable insulation material, and mounted in the outer end wall for the outlet 84, whereby the pipes 88, 89, are insulated from the mounting 5′.

The rectifying elements are preferably of the day contact type and are produced by placing copper plates of the desired size in an electric furnace in the presence of oxygen and subjecting them to a temperature slightly below the melting point of the copper for a sufficient length of time to produce coatings of copper oxide 48 on their opposite surfaces. The plates are then removed and when cool pure copper is sprayed on the surfaces of the copper oxide to apply thereto the copper layers 49. Thereafter predetermined portions of the copper oxide layers 48 and copper layers 49 are removed, as by a grinding operation, as shown in Figs. 5 and 6, to expose the copper material 47 of the plates for contact with the blocks 55 (Fig. 3A) and blocks 66 (Fig. 3B).

It will be noted that the bolts 16, which extend through the number 12b′, terminals 17, 17a and pads 14a, serve to clamp all parts of the welding mechanism together and to the section 12, so that they rotate as a unit in the bearings 11.

Figs. 18, 19, 20, 22 and 23 illustrate a modified form of construction wherein a single phase transformer is employed, (a) the primary winding of which is connected to leads 95, receiving A. C. from mains 32a through the electrical connections, indicated as an entirety at 96, these connections being preferably constructed similarly to corresponding parts shown in Figs. 1A, 12 and 13; and (b) the secondary winding of which is connected to terminals 15x, 15x′. Referring to these views, 5x indicates a mounting rotatably supported in bearings (one bearing being shown at 11x) constructed similarly to that shown in Fig. 1A, except that the section 12x is provided with four arms 13x (see Fig. 20). The welding mechanism comprises the single phase transformer 9x, the core 9x′ of which is rigidly secured to the arms 13x by bolts 13x′, electrodes 6x, 6x' (electrically insulated from each other), conductor devices 14x, 14y, electrically connected to the electrodes 6x, 6x', respectively, and having integral extension members 14x', 14y', respectively (electrically insulated from the mounting section as shown at 12x'), and a rectifier 10x. These parts just referred to, except the rectifier 10x, are substantially similar in construction to corresponding parts already described in connection with Figs. 1A to 13, inclusive.

The rectifier 10x consists of a pair of rectifying elements 97, 97a, interposed between and electrically connected to the extension members 14x', 14y', respectively, and the secondary winding terminal 15x' and a pair of rectifying elements 98, 98a, interposed between and electrically connected to the extension members 14x', 14y', respectively, and the secondary winding terminal 15x.

Each rectifying element 97, 97a, 98, 98a, consists of a plate of copper 99, one surface of which is provided with a coat or layer of copper oxide 99a. As shown in Fig. 22, the layer of copper oxide 99a on the rectifying element 97 is disposed adjacent to the terminal 15x', whereas the copper oxide on the rectifying element 97a is disposed adjacent to the extension 14y'; and as shown in Fig. 23, the copper oxide 99a on the rectifying element 98 is disposed adjacent to the terminal 15x whereas the copper oxide on the rectifying element 98a is disposed adjacent to the extension member 14y'. In this arrangement of the rectifying elements, when the polarity of the current to the terminal 15x' is positive, the current flow is from terminal 15x' through the rectifying element 97, extension member 14x', conductor device 14x to the electrode 6x (see arrows Z) and through the work to the electrode 6x', and from the latter electrode through the conductor device 14y, extension member 14y', rectifying element 98a to the terminal 15x (see arrows Z'); upon reversal of current in the secondary winding, current flow from the terminal 15x is through the rectifying element 98, extension member 14x', conductor device 14x, electrode 6x (see dotted arrows Z'') and through the work to the electrode 6x' and from the latter electrode through the conductor device 14y, extension 14y', the rectifying element 97a to the terminal 15x' (see dotted arrows Z'''). Accordingly, it will be seen that direct or unidirectional current will be supplied alternately from the rectifying elements, 97, 98, in contact with the terminals 15x, 15x', respectively, to the electrode 6x and through the work to the electrode 6x' and return from the latter to the rectifying elements 98a, 97a, and alternately through the latter to the terminals 15x, 15x', respectively.

By preference, I provide between the opposite surfaces of each rectifying element 97, 97a, 98, 98a and the adjacent secondary winding terminal and extension member sheets of relatively soft conducting material, such as lead 100, all of these parts being secured together in face to face relation by a plurality of screws 101, which extend therethrough, the head of each screw being counter-sunk in the adjacent extension member and its free end being threaded into the adjacent terminal. Each screw 101 is suitably insulated from the extension member, rectifying element and lead sheets by insulation material 102, as shown in Figs. 22 and 23. The soft characteristic of the lead sheets enables them to engage uneven portions of the surfaces with which they engage and accommodate themselves to the rough surfaces of the copper oxide, to insure a uniform flow of the current throughout all portions of the respective rectifying elements.

It will be noted that the screws 101, secure together the terminals 15x, 15', to the extension members 14x', 14y'; also that bolts 103 secure the extension members to the arms 13x, so that all parts of the welding mechanism rotate as a unit.

It will be understood that the number of rectifying elements between each extension member 14x', 14y', and the adjacent terminal may be increased dependent upon the amount of current that is to be used in carrying out any particular welding operation.

In the use of a single phase transformer and rectifier direct current as shown diagrammatically in Fig. 21 is produced, whereas in the employment of three single phase transformers interconnected and each on one phase, a much smoother direct current is produced, as diagrammatically shown in Fig. 15.

Figs. 16 and 17 illustrate a rectifier 10x' of the electrolytic type, disposed between and electrically connected to the terminals 104 of each transformer unit and the extension members 105, 105a, of the conductor devices 105', 105a', respectively. As shown, I provide for each transformer unit 106 (a) a pair of containers 107, 107a, containing the electrolyte B, the container 107 having poles 107', 107a', submerged therein and the container 107a having poles 107x, 107x', submerged in the electrolyte B; the poles 107', 107x', are connected to the adjacent secondary winding terminal 104 by studs 108 formed of copper, whereas the poles 107a', 107x, are electrically connected in a similar manner to the extension members 105, 105a, respectively; and (b) a pair of containers 109, 109a, containing the electrolyte B having submerged therein poles electrically connected to the adjacent parts, similarly to that shown in Fig. 16, except that the poles, which correspond to the poles 107', 107x', shown in Fig. 16, are electrically connected to the other secondary winding terminal. Assuming that the current flows in the direction of the arrow b, such flow will be from the terminal 104 through the pole 107', electrolyte B in container 107, pole 107a', extension member 105, conductor devices 105' to the adjacent electrode and through the work to the other electrode and from the latter electrode through conductor device 105a', extension member 105a, poles connected thereto submerged in container 109a, the electrolyte B therein and the poles connected to the other secondary winding terminal. Upon the reversal of the current, the flow will be from the other secondary winding terminal through the pole 107' in container 109 and the electrolyte therein and return through pole 107x in container 107a, the electrolyte in container 107a and the pole 107x' (see arrow b') to the adjacent secondary winding terminal 104. The walls of each container is formed of suitable insulation material. Where the electrolyte B consists of a solution of borax, the pole 107', the corresponding pole in container 109 and the poles 107x are preferably formed of aluminum and the remaining poles are formed of lead. Where the electrolyte B consists of sulphuric acid the poles 107', the corresponding pole in container 109, and poles 107x are preferably formed of tantalum and the remaining poles are formed of lead. It will be understood that other electrolytic solutions may be used and that the poles may be formed of such materials as will be found most desirable or effective according to the kind of electrolyte used.

From the foregoing description it will be noted that I have provided a rotary welding mechanism, which includes a rectifier, so that the transformer, rectifier and electrodes rotate as a unitary structure, and by way of example, certain forms of rectifier are of the junction type and a modified form is of the electrolytic type. It will also be noted that this arrangement results in a materially simplified, economical construction and insures highly efficient results.

To those skilled in the art to which my invention relates, many changes in construction and widely differing embodiments and applications of the invention will be apparent without departing from the spirit and scope thereof. My disclosures and the illustration herein are purely illustrative and are not intended to be in any sense limiting.

What I claim is:

1. In apparatus of the class described, the combination with a support, of a sectional frame rotatably mounted on said support, current rectifying means, a transformer fixedly related to one section of said frame and rotatable therewith and having the terminals of its secondary winding electrically connected to said rectifying means, other sections of said frame consisting of conductor devices electrically insulated from each other and the first mentioned frame section and electrically connected to said rectifying means, said current rectifying means being mounted between and rigidly secured to said frame section to which said transformer is fixed and said other frame sections, and electrodes fixedly related and electrically connected to said conductor devices.

2. In apparatus of the class described, the combination with a support provided with bearings, a welding mechanism rotatably mounted on said bearings and comprising a frame the outer end of which engages one of said bearings, conductor devices having extension members rigidly connected to the opposite end of said frame and electrically insulated therefrom, one of said conductor devices engaging the other bearing, electrodes fixed to and electrically connected to said conductor devices, respectively, and electrically insulated from each other, a transformer fixedly related to said frame and rectifying elements disposed between and electrically connected to the terminals of the secondary winding of said transformer and said extension members, and means for supplying alternating current to the primary winding of said transformer.

3. In welding apparatus, the combination with a support having spaced bearings, of a unitary assembly mounted on said bearings and comprising a pair of circular welding electrodes mounted for rotation about the axis of said bearings, a supply transformer also mounted to rotate with said electrodes about the same axis, a rectifier assembly mounted for rotation with said transformer and electrodes, said rectifier assembly comprising a plurality of uni-directional conductive elements symmetrically disposed about said axis and in spaced relation to each other to permit air to flow between said elements radially from said axis, connections for supplying alternating current to said rectifier assembly from said transformer, and connections for supplying direct current from said rectifier assembly to said electrodes.

4. Welding apparatus according to claim 3 wherein said supply transformer comprises a multi-phase transformer formed of a plurality of single-phase transformers symmetrically disposed about the axis of rotation of said electrodes.

5. Welding apparatus according to claim 3 wherein said supply transformer embodies three secondary windings connected in delta connection, and said rectifier comprises at least three rectifying paths bridged across two supply conductors leading to said welding electrodes, each bridging path including two rectifier units connected in series relation, and connections from each point of said delta connection to the respective midpoints of said bridging paths.

6. Welding apparatus according to claim 3 wherein said rectifier is of the dry contact type and comprises a plurality of spaced parallel plates arranged so that the spaces between said plates form ventilating channels arranged radially with respect to the axis of rotation of said rectifier.

7. Welding apparatus according to claim 3 wherein said rectifier comprises a plurality of rectifier units of the dry contact type symmetrically arranged around the axis of rotation of said electrodes and spaced from said axis to provide an open space in the center of said rectifier, said rectifier units being formed of a plurality of spaced plates arranged so that the spaces between said plates form ventilating passages leading from said central open space to the outer periphery of said rectifier, an air supply tube arranged concentrically with the axis of rotation of said electrodes and having one end thereof communicating with said central opening in said rectifier, and means for supplying air under pressure to the other end of said tube.

8. In welding apparatus, the combination of a pair of circular welding electrodes mounted in bearings for rotation about a common axis, a rectifier assembly mounted for rotation with said electrodes and comprising a plurality of rectifier units symmetrically arranged around the axis of rotation of said electrodes and being spaced from said axis to provide an open space at the center of said rectifier assembly, an air supply tube arranged concentrically with the axis of rotation of said electrodes and having one end thereof communicating with said open space in said rectifier assembly and the outer end thereof extending through one supporting bearing for said electrodes, and means for supplying air under pressure to the outer end of said tube.

9. In combination, a frame journaled in a bearing for rotation about a given axis, a rectifier assembly mounted on said frame for rotation about said axis and comprising a plurality of rectifier units symmetrically arranged around said axis and spaced therefrom to provide an open space in the center of said rectifier assembly, said rectifier assembly having ventilating passages extending from said open space to the outer periphery thereof, and an air supply tube passing through said bearing concentrically with said axis of rotation and having the inner end thereof communicating with said central opening.

10. In welding apparatus, the combination with a support having spaced bearings, of a unitary assembly mounted on said bearings and comprising a pair of circular welding electrodes mounted for rotation about the axis of said bearings, a supply transformer also mounted to rotate with said electrodes about the same axis, a rectifier assembly mounted for rotation with said transformer and electrodes, said rectifier assembly comprising a plurality of uni-directional conductive elements symmetrically disposed about said axis and in spaced relation to each other, means for causing air to flow radially out from said axis and in contact with said elements to cool the same, connections for supplying alternating current to said rectifier assembly from said transformer, and connections for supplying direct current from said rectifier assembly to said electrodes.

11. An apparatus as claimed in claim 1 wherein the current rectifying means is of the electrolytic type.

12. An apparatus as claimed in claim 1 wherein said current rectifying means consist of chambers each containing an electrolyte, poles submerged therein and electrically connected to the secondary winding of said transformer, separate poles submerged in the electrolyte of certain of said chambers and electrically connected to one of said last mentioned frame sections and separate poles submerged in the electrolyte of the other chambers and electrically connected to the other of said last mentioned frame sections.

HOWARD I. MORRIS.

Certificate of Correction

Patent No. 2,395,059. February 19, 1946.

HOWARD I. MORRIS

It is hereby certified that errors appear in the printed specification of the above numbered patent requiring correction as follows: Page 5, second column, line 37, for "day" read *dry*; page 6, first column, line 52, for "15x" first occurrence, read *15x'*; and that the said Letters Patent should be read with these corrections therein that the same may conform to the record of the case in the Patent Office.

Signed and sealed this 21st day of May, A. D. 1946

[SEAL]

LESLIE FRAZER,
*First Assistant Commissioner of Patents.*